Oct. 26, 1954          G. GOLDSTEIN            2,692,694
                          LIFT
Filed July 14, 1952                      2 Sheets-Sheet 1

Gustav Goldstein
       INVENTOR.

BY *Clarence A. O'Brien*
   *and Harvey B. Jacobson*
                    Attorneys Oct. 26, 1954   G. GOLDSTEIN   2,692,694
LIFT
Filed July 14, 1952   2 Sheets-Sheet 2
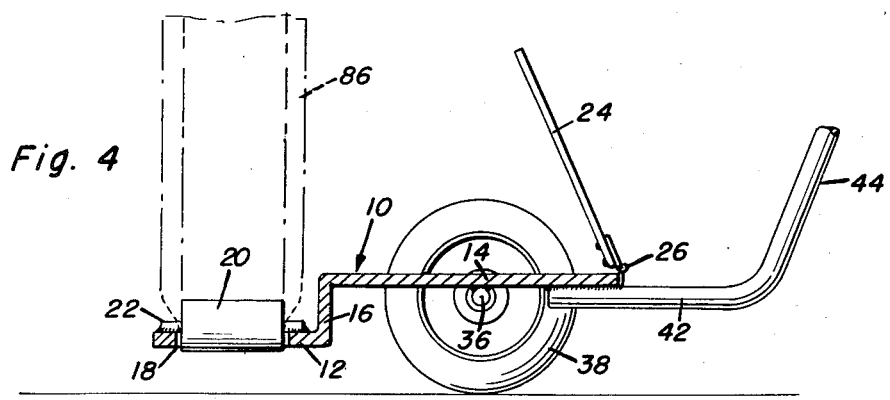
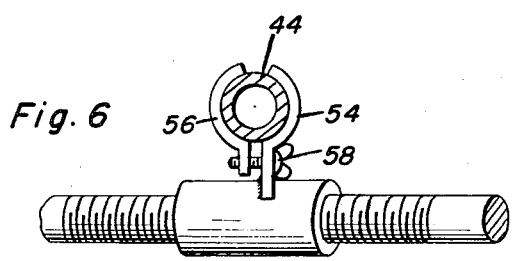
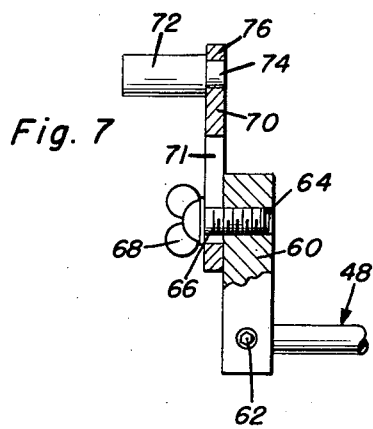
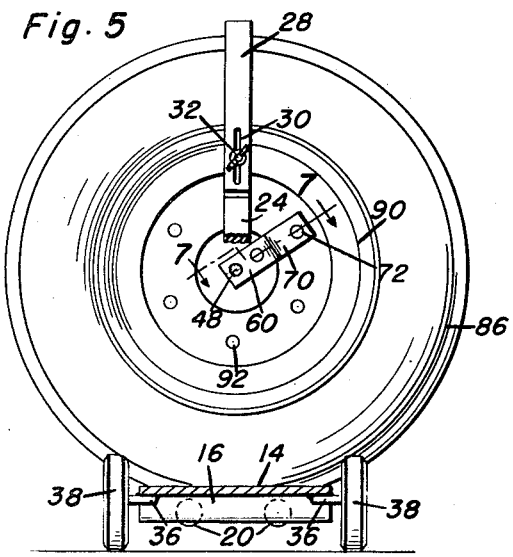
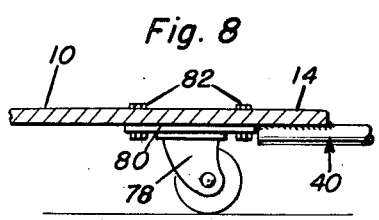
Gustav Goldstein
INVENTOR.
BY *Clarence A. O'Brien*
*and Harvey B. Jacobson*
Attorneys Patented Oct. 26, 1954

2,692,694

UNITED STATES PATENT OFFICE 2,692,694

LIFT

Gustav Goldstein, Colchester, Conn., assignor of one-half to Desiree M. Jacobs, Colchester, Conn.

Application July 14, 1952, Serial No. 298,822

2 Claims. (Cl. 214—332)

This invention relates in general to lift devices, and more particularly to a lift for removing heavy wheels from vehicles.

The primary object of this invention is to provide an improved lift which may be utilized by one man for removing a heavy wheel from a truck, bus or other heavy vehicle.

Another object of this invention is to provide an improved lift which is extremely movable whereby the same may be utilized for moving a tire from one place to another, said lift being provided with a pair of supporting wheels and having a handle extending rearwardly therefrom whereby a tire mounted thereon may be easily counterbalanced by an operator.

Another object of this invention is to provide an improved lift which is relatively simple in construction and formed of readily obtainable materials whereby the same is economically feasible.

Another object of this invention is to provide an improved lift which is compact and light in weight whereby the same may be easily stored or carried on a repair truck.

A further object of this invention is to provide an improved lift adapted primarily for use in removing and attaching tires to a heavy vehicle, said lift having means for supporting a tire for rotation thereon and other means for rotating said tire whereby the associated wheel may be aligned with a drum or supporting hub of the vehicle to which it is desired to be attached, said lift being operable by a single man.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 4 is an enlarged fragmentary transverse vertical sectional view taken substantially on the plane indicated by the section line 4—4 of Figure 2 and shows the general shape of a base of the lift and the relationship of a wheel thereto, said base including a roller for supporting a wheel for rotation while mounted on the base;

Figure 5 is a transverse vertical sectional view taken substantially upon the plane indicated by the section line 5—5 of Figure 1 and shows the means for clamping the wheel to the base and the construction of the forward end of the means for rotating the wheel while mounted on the base;

Figure 6 is an enlarged fragmentary transverse substantially horizontal view taken substantially on the plane indicated by the section line 6—6 of Figure 1 and shows the manner in which a crank is adjustably carried by a handle of the lift, said crank being utilized in rotating the wheel;

Figure 1:
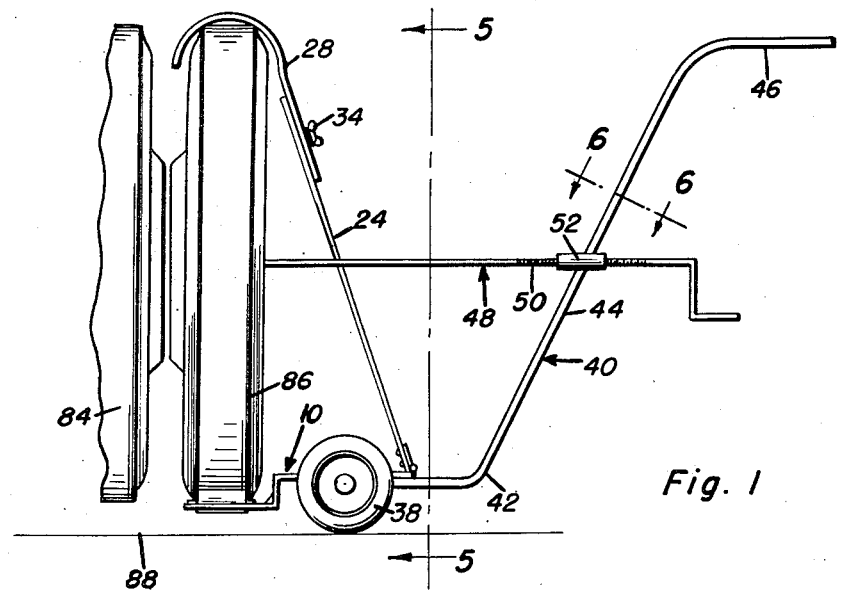
Figure 1 is a side elevational view of the improved lift, which is the subject of this invention, and shows the same being utilized in the process of attaching a wheel to one side of a dual wheel truck, only the dual wheels of the truck being illustrated.
Figure 2:
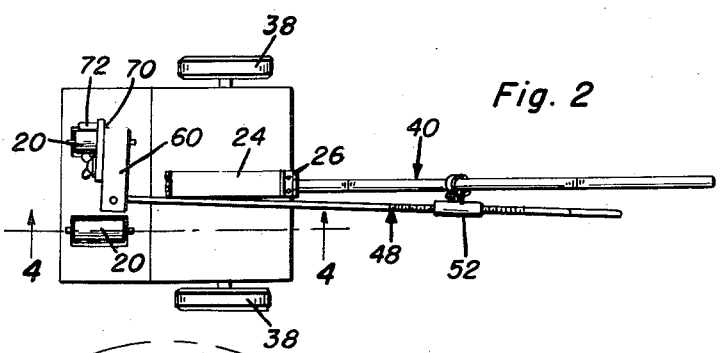
Figure 2 is a top plan view of the lift of Figure 1, the wheel being removed.
Figure 3:
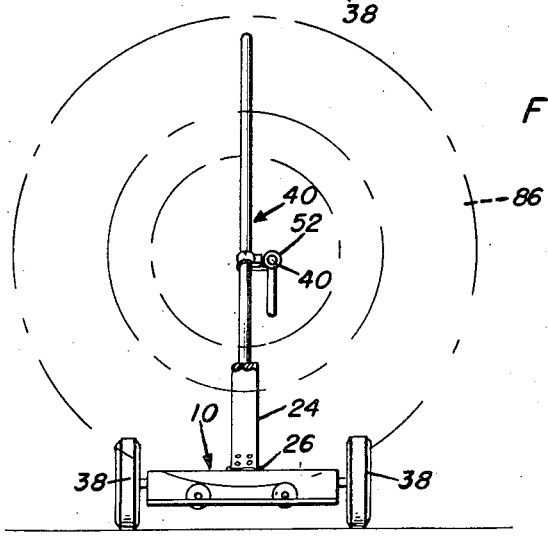
Figure 3 is a front elevational view of the lift of Figure 1 and has a wheel illustrated in dotted lines as being positioned thereon, means for clamping the wheel to the lift and means for rotating the same being broken off and shown in section.

Figure 7 is an enlarged fragmentary transverse vertical sectional view taken substantially upon the plane indicated by the section line 7—7 of Figure 5 and shows the arrangement at the forward end of the crank for attaching the same to a wheel; and Figure 8 is an enlarged fragmentary transverse vertical sectional view taken through the base in the vicinity of one of its supporting wheels and shows the construction of a modified form thereof.

Similar characters of reference designate similar or identical elements and portions throughout the specification and throughout the different views of the drawings.

Referring now to the drawings in detail, it will be seen that the lift, which is the subject of this invention, includes a base portion which is referred to in general by the reference numeral 10. The base portion 10 is generally rectangular in plan view and Z-shaped in longitudinal cross-section and includes a lower front portion 12 connected to an upper rear portion 14 by a transversely extending vertical portion 16. The front portion 12 of the base 10 is provided with a pair of generally elongated rectangular openings 18 in which are mounted rollers 20, the rollers 20 being supported by shafts 22 secured to the upper surface of the front portion 12. It will be understood that the rollers 20 are in transversely spaced parallel relation and are adapted to support a wheel for rotation while mounted on the base 10.

In order that the wheel may be clamped in position upon the base 10, the base has extending upwardly and forwardly from the rear end of the rear portion 12 an elongated bar 24. The bar 24 is hingedly connected to the rear portion 14 by a hinge 26 in order that it may be tilted to accommodate tires of different heights.

As is best illustrated in Figure 1, the bar 24 has adjustably secured to the upper end thereof a hook-shaped member 28 which is adapted to overlie an upper portion of a wheel and clamp the same in an upright position on the base 10. The hook-shaped member 28 is provided with an elongated slot 30 adjacent the lower end thereof, the slot 30 receiving a fastener 32 carried by the bar 24 with the hook-shaped member 28 clamped in an adjusted position by a wing nut 34 tightened down upon the fastener 32.

Referring now to Figures 4 and 5, it will be seen that in order that the base 10 may be utilized to conveniently move a wheel mounted thereon, the same is provided with a pair of stub axles 36 secured to the underside of the rear portion 14 intermediate the ends thereof and extending outwardly therefrom. Mounted on the stub axles 36 for rotation are a pair of conventional wheels 38 which are preferably of the ball bearing type.

Extending rearwardly from the base 10 is a generally Z-shaped handle, which is referred to in general by the reference numeral 40. The handle 40 includes a lower horizontal portion 42 which is connected to the underside of the rear portion 14 of the base 10 by welding or other conventional fastening means. Integral with the rear end of the lower horizontal portion is an intermediate upwardly and rearwardly extending portion 44 whose upper end terminates in an upper horizontal portion 46, the upper horizontal portion 46 forming a grip portion for the handle 40. It will be understood that the grip portion is positioned a greater distance rearwardly of the stub axles 36 than the distance between the center lines of the rollers 20 and the stub axles 36 whereby the weight of a wheel mounted on the front end of the base 10 may be easily counterbalanced.

In order that a wheel carried by the lift may be rotated for correctly positioning the same with respect to either lugs or lug receiving apertures, the handle 40 has secured to the intermediate portion 44 thereof a crank 48. The crank 48 includes a threaded intermediate portion 50 which is received within an internally threaded sleeve 52. The sleeve 52 extends horizontally and has integral therewith a first half 54 of a clamp. The clamp includes a second half 56 which is connected to the first half 54 by a fastener 58. It will be understood that the halves 54 and 56 of the clamp pass around and are adjustably secured to the intermediate portion 44 of the handle 40 by tightening down upon the fastener 58. In order that the crank 48 may be associated with a wheel carried by the base 10, the forward end thereof is provided with a crank arm 60 pivotally connected to the crank 48 by a locking screw 62 which extends into a bore in the crank arm 62 receiving the forward end of the crank 48. The crank arm 60 has adjacent the other end thereof an internally threaded bore 64 in which is mounted a fastener 66 having a wing head 68. The fastener 66 adjustably clamps to the crank arm 60 a bar 70 and is received in an elongated slot 71 therein. The bar 70 is provided with a pin 72 which is adapted to fit in a lug hole in a wheel for rotating the same upon rotation of the crank 48. The pin 72 has a reduced rear end portion 74 which is positioned within a bore 76 adjacent the free end of the bar 70.

Referring now to Figure 8 in particular, it will be seen that when the lift, which is the subject of this invention, is intended to be utilized around a garage the stub axles 36 and the wheels 38 are replaced by swivel-type casters 78. Each of the casters 78 includes a mounting flange 80 which is secured to the underside of the rear portion 14 by a plurality of fasteners 82.

Referring now to Figure 1 in particular, it will be seen that there is illustrated a dual wheel construction of a conventional truck and includes an inner rear wheel 84 and an outer rear wheel 86. The rear wheels 84 and 86 are elevated due to the jacking of the same off of a supporting surface 88 and the wheel 86 is in the process of being replaced.

Referring to Figure 5 in particular, it will be seen that the wheel 86 includes a rim 90 which has a plurality of lug holes 96 adapted to receive lug bolts (not shown) of a supporting drum or hub (not shown). It will be also noted that the pin 72 associated with the crank 48 is positioned in one of the lug holes 92 whereby the wheel 86 is rotated upon rotation of the crank 48. Due to this novel feature, the wheel 86 may be rotated until the lug holes 92 are in alignment with their respective lugs and the wheel moved forward into mounting position while an operator of the lift is holding on to the handle 40.

When it is desired to change a tire with the lift, which is the subject of this invention, the flat tire and its associated wheel are raised off of the ground in the normal manner. Then the lift is placed in position under the wheel and tire so that the tire is directly over and between the rollers 20 of the base 10. Next, the wheel nuts or lugs are removed leaving the wheel and tire on the vehicle, but free to be removed therefrom. The hook-shaped member 28 is then positioned over the upper portion of the tire and the pin 72 is adjusted to fit into one of the lug holes 92. When the hook-shaped member 28 and the pin 72 are so positioned, the person removing the wheel 86 presses downwardly upon the grip portion 46 of the handle 40 and pulls the lift rearwardly to remove the wheel 86 of the vehicle.

When it is desired to replace the wheel 86 utilizing the lift, which is the subject of this invention, the wheel 86 is leaned against some part of the vehicle or an adjacent structure and the lift is run alongside the wheel so that the base 10 is at one side of the wheel. The wheel is then rolled onto the front portion 12 of the base 10 between the rollers 20 and clamped in place by the hook-shaped member 28. The crank 48 is then adjusted until the pin 72 is positioned within one of the lug holes 92 of the wheel 86. Next the handle 40 of the lift is pressed downwardly to raise the wheel and the lift is rolled into position adjacent the hub or drum of the vehicle. After the wheel 86 has been positioned closely adjacent its associated drum or hub, the crank 48 is rotated to align the lug holes 92 with lugs carried by the drum or hub. After the lug holes have been aligned, the wheel 86 is moved into position by a forward movement on the handle 40. The handle is then released and wheel nuts are placed on the lugs to secure the wheel 86 back in its proper position. After the wheel 86 has been secured in place, the lift is disengaged from the wheel and removed prior to the lowering of the wheels 84 and 86 to their ground engaging positions.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A lift for facilitating the removal of wheels from vehicles, said lift including a supporting base, clamp means for retaining a wheel on said base in an upright position, said clamp means permitting said lift to be utilized in pulling a wheel off of an associated drum, said clamp means permitting rotation of the wheel on said base whereby the wheel may be rotated for aligning the same for engagement by moutning lugs, means engageable with the wheel for rotating the same from a remote position, said means engageable with the wheel including a rearwardly extending crank having connecting means at the forward end thereof engageable in a lug hole of the wheel, a handle extending rearwardly from said base for facilitating positioning of said base, a sleeve carried by said handle, said crank being carried by said sleeve in an operative position for engaging a wheel.

2. A lift for facilitating the removal of wheels from vehicles, said lift including a supporting base, clamp means for retaining a wheel on said base in an upright position, said clamp means permitting said lift to be utilized in pulling a wheel off of an associated drum, said clamp means permitting rotation of the wheel on said base whereby the wheel may be rotated for aligning the same for engagement by mounting lugs, means engageable with the wheel for rotating the same from a remote position, said means engageable with the wheel including a rearwardly extending crank having connecting means at the forward end thereof engageable in a lug hole of the wheel, a handle extending rearwardly from said base for facilitating positioning of said base, a sleeve carried by said handle, said crank being carried by said sleeve in an operative position for engaging a wheel, said sleeve being adjustably secured to said handle whereby said crank may be vertically adjustably positioned for engagement with wheels of different sizes.

References Cited in the file of this patent

UNITED STATES PATENTS

| Number | Name | Date |
|---|---|---|
| 1,892,979 | Clark | Jan. 3, 1933 |
| 2,364,918 | Roberson | Dec. 12, 1944 |